United States Patent [19]

Sproul

[11] 4,299,584
[45] Nov. 10, 1981

[54] BELT TENSIONER CONSTRUCTION

[75] Inventor: Nolte V. Sproul, Canton, Ohio

[73] Assignee: Dyneer Corporation, Canton, Ohio

[21] Appl. No.: 108,136

[22] Filed: Dec. 28, 1979

[51] Int. Cl.³ .............................................. F16H 7/12
[52] U.S. Cl. ..................................... 474/135; 474/139
[58] Field of Search ............... 474/135, 138, 117, 115, 474/118, 139

[56] References Cited

U.S. PATENT DOCUMENTS

| | | | |
|---|---|---|---|
| 2,051,488 | 8/1936 | Kottlowski | 74/242.11 R |
| 2,703,019 | 3/1955 | Burawoy | 74/242.11 R |
| 2,893,255 | 7/1959 | Bayliss | 474/111 |
| 3,142,193 | 7/1964 | Polko et al. | 474/110 |
| 3,413,866 | 12/1968 | Ford | 74/242.11 R |
| 3,483,763 | 12/1969 | Enters | 474/88 |
| 3,631,734 | 1/1972 | Wagner | 74/242.11 R |
| 3,710,634 | 1/1973 | Tamaru et al. | 74/242.11 S |
| 3,768,324 | 10/1973 | Drake | 474/115 |
| 3,812,733 | 5/1974 | Yoshida | 74/242.11 S |
| 3,924,483 | 12/1975 | Walker et al. | 74/242.11 R |
| 3,964,331 | 6/1976 | Oldfield | 74/242.1 FP |
| 3,965,768 | 6/1976 | Foster | 474/135 |
| 3,975,965 | 8/1976 | Speer | 474/135 |
| 3,986,407 | 10/1976 | Naggert | 474/110 |
| 4,077,272 | 3/1978 | Busso | 474/110 |
| 4,108,013 | 8/1978 | Sragal | 74/242.11 C |
| 4,144,772 | 3/1979 | Brackin et al. | 74/242.15 R |

FOREIGN PATENT DOCUMENTS 493953  6/1953  Canada ............................ 474/138
336737 10/1930  United Kingdom .

Primary Examiner—C. J. Husar
Assistant Examiner—Conrad Berman
Attorney, Agent, or Firm—Frease & Bishop

[57] ABSTRACT

A belt tensioning device for an endless drive belt for a vehicle accessories drive system. A sheet metal bracket is adapted to be mounted on an engine adjacent the drive belt and has a lever plate pivotally mounted thereon. An idler pulley is rotatably mounted on the lever plate and is adapted to be moved in a belt tensioning direction for engagement with the drive belt. A coil spring is mounted on the bracket and is engaged with the lever plate biasing the lever plate and pulley in the belt tensioning direction. A series of ratchet teeth is provided in the lever plate and is engaged by a detent which is mounted on the bracket and formed of a strip of spring steel. The spring steel detent-ratchet teeth engagement retards movement of the lever plate in a direction opposite to belt tensioning direction. Also the detent will bow outwardly due to the resiliency thereof while retarding the reverse movement of the lever plate to provide a damping effect on the belt engaging pulley. Alternately a pad of friction material may be mounted on the end of the leaf spring detent and frictionally engage the lever plate to provide the damping effect replacing the series of ratchet teeth.

12 Claims, 10 Drawing Figures

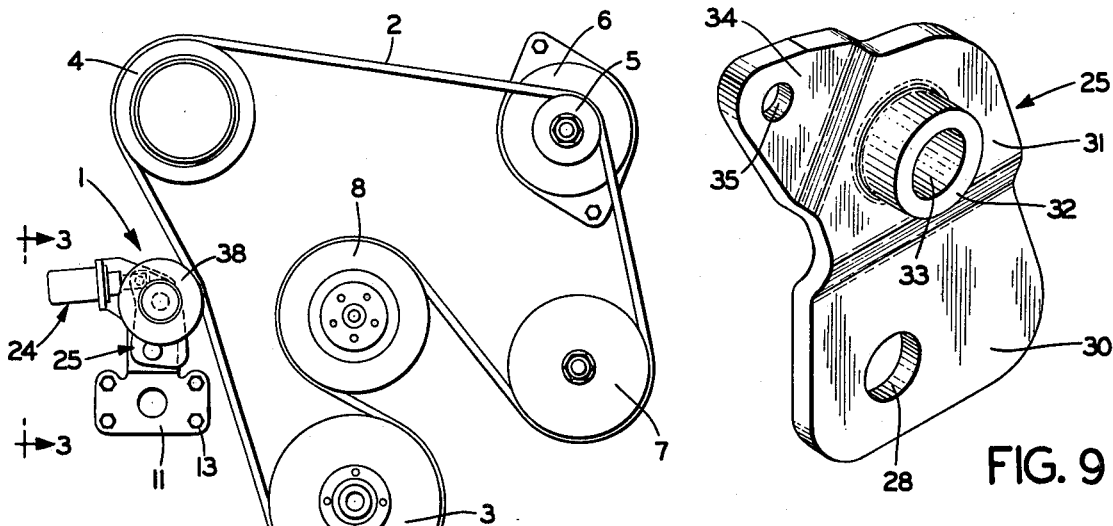
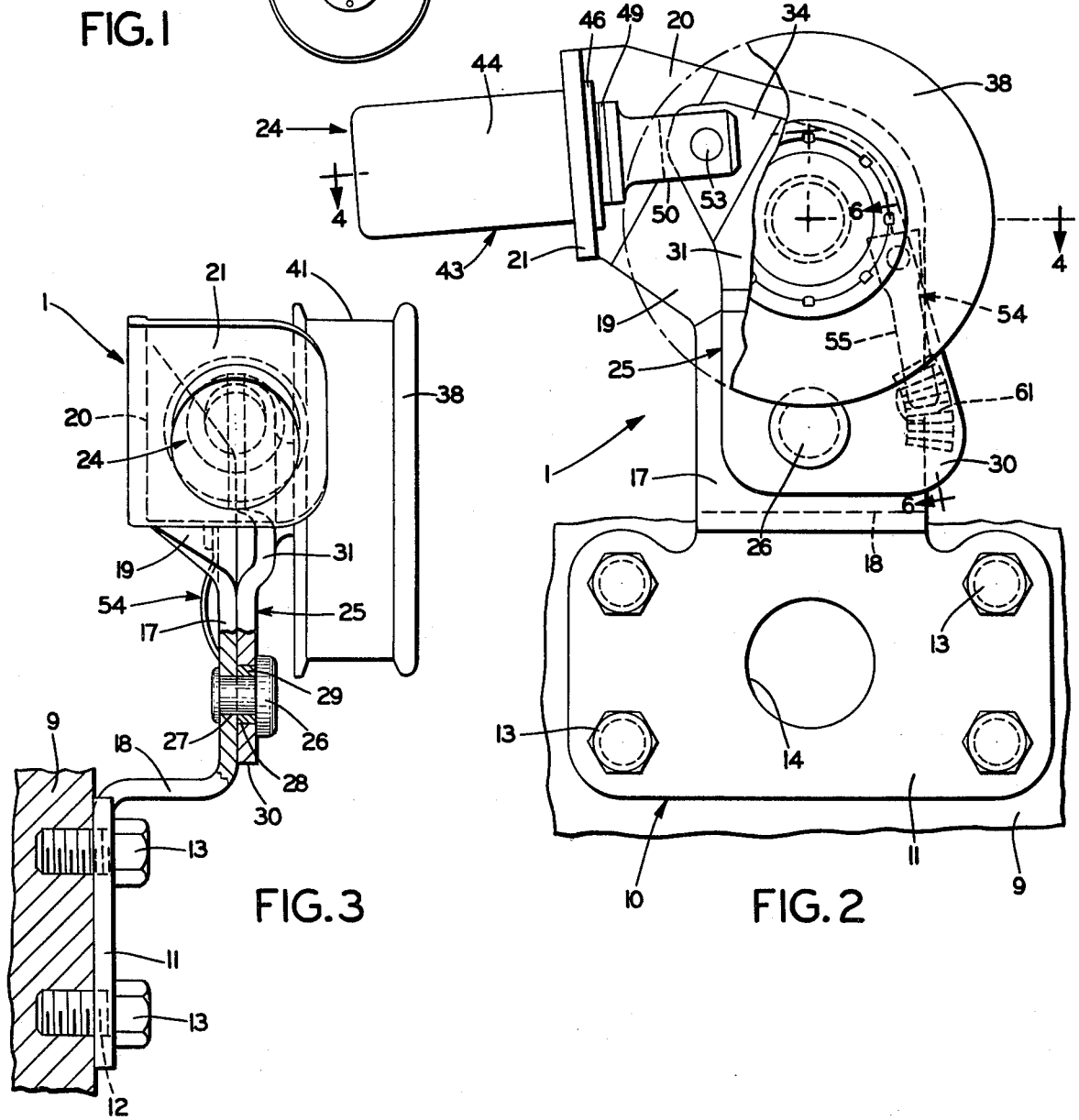

BELT TENSIONER CONSTRUCTION

BACKGROUND OF THE INVENTION

1. Field of the Invention

The invention relates to belt tensioning devices and arrangements, and in particular to a spring actuated belt tensioner for use with an endless belt of a vehicle accessories drive system. More particularly, the invention relates to an improved, inexpensive belt tensioner construction having a unique damping mechanism, which mechanism also limits movement of the belt engaging pulley in an opposite nontensioning direction in order to maintain a nearly constant tensioning force on the belt regardless of the amount of belt stretch.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To insure optimum operating efficiency for these various accessories, it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioner constructions, which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before full damping is achieved.

Numerous other types of belt tensioning devices use coil springs which are either in compression or tension, for applying and maintaining the tensioning force on a belt-engaging idler pulley or chain-engaging sprocket. Some examples of these types of constructions are shown in U.S. Pat. Nos. 2,703,019, 3,413,866, 3,483,763, 3,631,734, 3,768,324, 3,812,733, 3,924,483, 3,965,768 and 4,108,013. Some coil spring actuated devices use the biasing force of a spring in combination with hydraulic actuated members for regulating the amount of tensioning force applied to the belt and for achieving a damping effect. Examples of these combination spring and hydraulic-actuated belt tensioners are shown in U.S. Pat. Nos. 2,051,488, 3,142,193 and 4,077,272.

It is desirable that a belt tensioner be provided with some type of damping means to prevent excessive oscillation from occurring in the spring tensioning member, and which will absorb sudden shocks to prevent a whipping action from occurring in the tensioner and drive belt, such as upon sudden acceleration and deceleration of the vehicle. This damping action is especially critical when a coil spring is used for applying the belt tensioning force since coil springs are highly susceptible to develop natural oscillating frequencies when the counter force, which is exerted thereon by the belt, fluctuates during acceleration and deceleration of the vehicle. Such oscillating action affects the efficiency of the tensioning force applied to the belt by the coil spring and reduces belt life.

Various damping devices have been used with belt tensioners to eliminate or reduce this problem of coil spring oscillation. One type of construction uses a hydraulic fluid as the damping means, such as shown in U.S. Pat. Nos. 2,893,255, 3,964,331, 3,986,407 and British Pat. No. 336,737. U.S. Pat. No. 3,710,634 shows a belt tensioner which uses an eccentrically mounted mechanical pinion and rack arrangement which is spring biased by a leaf spring for absorbing an excessive amount of shock as opposed to providing a damping action for a spring-biased belt tensioning plunger.

Various belt tensioning devices also are provided with some type of mechanical retaining means which limits the movement of the belt tensioning member in a direction opposite to the tensioning direction, thereby assisting the tensioning member to maintain a constant tensioning force on the endless drive belt by retaining the member in its forwardmost belt tensioning position. Many of these known retaining arrangements use a spring-biased mechanical detent-ratchet retaining means. Examples of these prior constructions and arrangements are shown in U.S. Pat. Nos. 2,051,488, 2,703,019, 3,413,866, 3,631,734 and 3,812,733.

It also is highly desirable when developing a belt tensioner intended primarily for use on an automobile to devise a construction which can be produced as inexpensively as possible without sacrificing durability and efficiency since a savings of only a part of a dollar would amount to a sufficient overall savings when considering the millions of vehicles that are produced by the various vehicle manufacturers.

Although many of the above-listed belt tensioners are believed to perform satisfactorily, it is believed that the subject belt tensioner of my invention provides an extremely inexpensive, rugged and efficient tensioning device, which achieves the desired damping action and belt tensioning force.

SUMMARY OF THE INVENTION

Objectives of the invention include providing an improved device for tensioning the drive belt for vehicle accessories which maintains a generally constant, predetermined tensioning force on the belt throughout the life of the belt regardless of whether the engine is on or off or operating at various speeds and conditions, which is of an extremely inexpensive design formed of several sheet metal components which can be mass produced by simple metal stamping procedures, and which then can be assembled with a usual pulley and compression spring. Another object is to provide such a belt tensioner which has a unique damping unit mounted thereon which also retards movement of the belt-engaging pulley in a nontensioning direction. Still another object is to provide such a belt tensioning device in which the mounting bracket portion can be constructed so as to be attached directly to the engine block, thereby eliminating an additional engine mounting bracket component heretofore required for mounting prior tensioning devices on the engine blocks, which results in a savings in material cost and weight. A further object is to provide such a belt tensioning device in which the damping is achieved by an inexpensive leaf spring which is mounted on the stationary engine mounting bracket portion and selectively engages a series of ratchet teeth or indentations formed on a pivotally mounted component of the tensioner on which the belt-engaging idler pulley is mounted, and in which the leaf spring retains the belt-engaging pulley in its forwardmost position in addition to absorbing any sudden shocks and forces exerted on the pulley by flexing or blowing outwardly. It is also an object to provide such a belt tensioner in which the improved damping and retaining feature can be incorporated into a tensioning mechanism which tensions a drive belt by pivotal movement of one of the vehicle accessories in order to provide alternate tensioning arrangements if desired by a particular vehicle manufacturer . Still another object is to provide such a belt tensioner in which the leaf spring damping arrangement operates completely independent of the main power source used for tensioning the belt, such as a coil spring, thereby enabling the full available tensioning force to be applied by the spring instead of requiring the spring to overcome the damping means as in some prior belt tensioning devices, and in which the damping effect can be achieved by use of a frictional element mounted on the extended end of the leaf spring, which element frictionally engages the moving bracket portion instead of engagement of the leaf spring end with the ratchet teeth. Likewise, it is an object to provide such an improved belt tensioner construction which achieves the stated objectives in a simple, effective, rugged and relatively inexpensive manner, and which solves problems and satisfies needs existing in the art.

These objectives and advantages are obtained by the improved belt tensioner construction for tensioning an endless drive belt for vehicle engine accessories, the general nature of which may be stated as including bracket means adapted to be mounted on a vehicle engine adjacent the drive belt with spring means mounted on the bracket means. Lever means is pivotally mounted on the bracket means and is biased by the spring means in a belt tensioning direction. Rotatable pulley means is mounted on the lever means and is movable into tensioning engagement with the drive belt upon pivotal movement of the lever means by the spring means. Damping means is operatively engageable with the bracket means and lever means to retard oscillatory movement of the lever means with said damping means including a strip of spring steel having one end attached to the bracket means and a second end engageable with the lever means. Engagement means is provided at the junction of the second end of the strip of spring steel and the lever means to retard pivotal movement of the lever means in a direction opposite to the belt tensioning direction.

BRIEF DESCRIPTION OF THE DRAWINGS

A preferred embodiment of the invention, illustrative of the best mode in which applicant has contemplated applying the principles, is set forth in the following description and shown in the accompanying drawings, and is particularly and distinctly pointed out and set forth in the appended claims.

FIG. 1 is a diagrammatic view looking toward the front of an engine illustrating an endless drive belt drivingly engaged with the vehicle accessories and with the improved belt tensioner construction engaged with the drive belt;

FIG. 2 is an enlarged front elevational view of the belt tensioner of FIG. 1, shown mounted on a portion of an engine;

FIG. 3 is an enlarged end elevational view looking the the direction of arrows 3—3, FIG. 1, showing the improved belt tensioner mounted on a portion of an engine with the drive belt removed therefrom;

FIG. 9 is a perspective view of the lever plate portion of the improved belt tensioner.

Similar numerals refer to similar parts throughout the drawings.

DESCRIPTION OF THE PREFERRED EMBODIMENT

Figure 4:
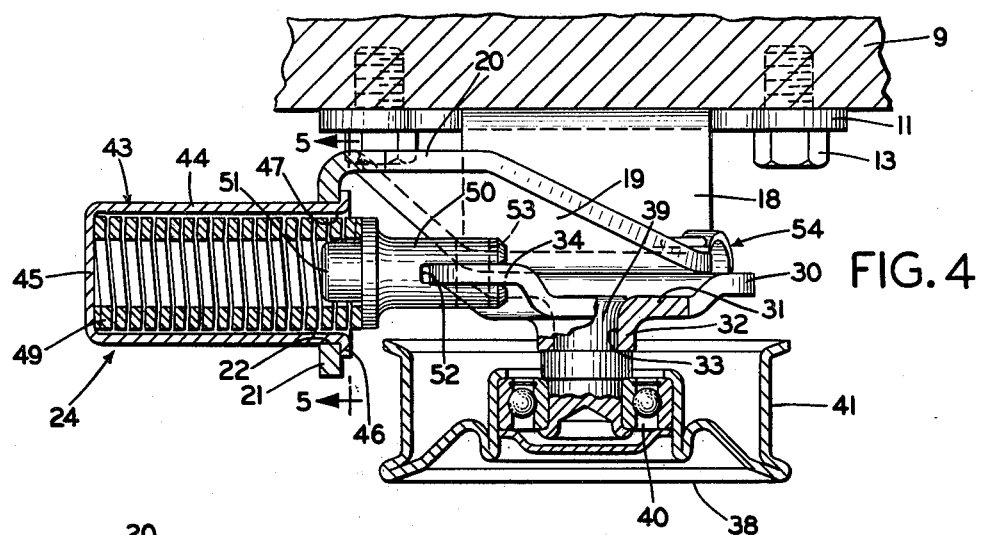
FIG. 4 is a sectional view of the improved belt tensioner taken on line 4—4, FIG. 2.

Referring to FIG. 1 of the drawings, the improved belt tensioner construction is indicated generally at 1, and is shown in tensioning engagement with an endless drive belt 2 of a power transmission belt drive system which is shown diagrammatically looking toward the front of an engine. The accessory drive system consists of a plurality of belt pulleys or sheaves having configurations and diameters determined by and associated with engine accessory components and their locations relative to each other. The various pulleys are supported on their respective engine components which in turn are mounted on an engine (not shown) in a usual manner known in the art. Belt 2 preferably operates in a single vertical plane to eliminate binding and skewing of the belt.

The particular engine accessories drive system shown in FIG. 1 consists of a main driving pulley 3 which is operatively connected to the main drive shaft of the engine, a pulley 4 which is operatively connected to the engine air pump, a pulley 5 which is operatively connected to an alternator 6 which provides electrical power for the engine, a pulley 7 which is operatively connected to the vehicle power steering unit, and a pulley 8 which is operatively connected to the engine water pump.

Improved belt tensioner 1 includes an engine mounting bracket indicated generally at 10 (FIG. 8), which is formed inexpensively of a one-piece, stamped, sheet metal member. Bracket 10 includes a mounting flange portion 11 which is formed with a plurality of holes 12 through which bolts 13 extend for mounting tensioner 1 on an engine 9 (FIGS. 2 and 3). An enlarged hole 14 may be formed in the center of mounting flange 11 for reducing the weight of tensioner 1 without sacrificing strength.

Figure 8:
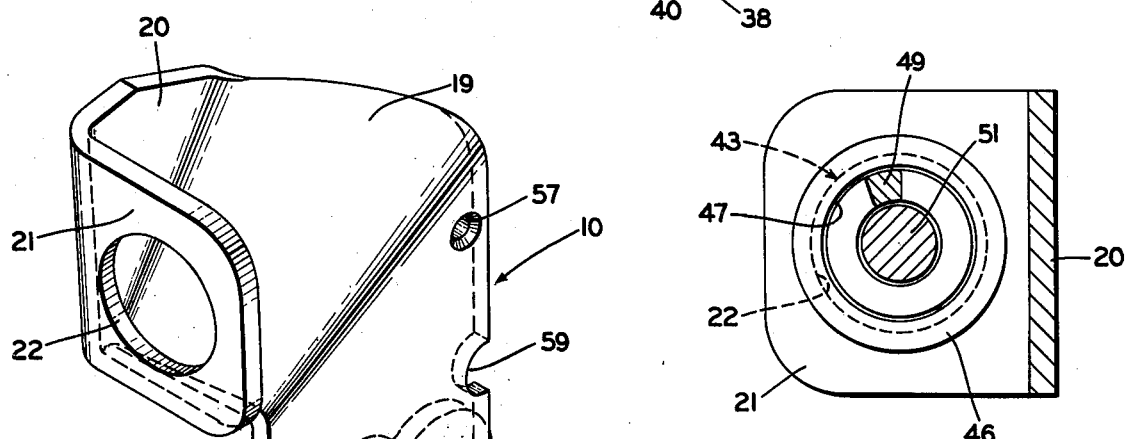
FIG. 8 is an enlarged perspective view of the mounting bracket portion of the improved belt tensioner.
Figure 5:
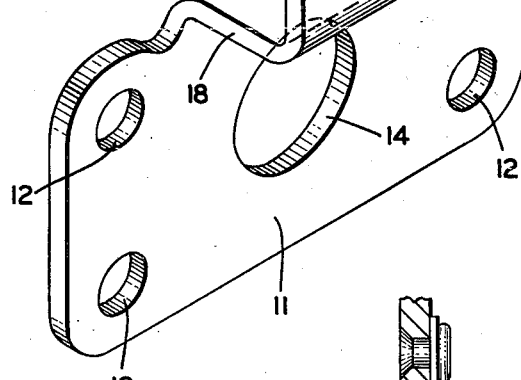
FIG. 5 is an enlarged sectional view taken on line 5—5, FIG. 4.

Bracket 10 further includes a generally flat, central portion 17 which is located in a plane which is spaced outwardly from and extends generally parallel with the plane of mounting flange 11 and is connected to flange 11 by an upstanding flange 18. Flange 18 extends perpendicularly between mounting flange 11 and central bracket portion 17 and is integrally connected thereto. Central bracket portion 17 is connected to an inwardly downwardly extending sloped portion 19, which in turn terminates in a somewhat triangularly shaped portion 20. Bracket portion 20 lies in a plane generally parallel with the planes of flange 11 and central portion 17 (FIGS. 4 and 8). Portion 20 is spaced outwardly from bracket flange 11 to provide sufficient clearance from engine 9. Bracket portion 20 terminates in a flange 21 which extends perpendicularly outwardly from portion 20. Flange 21 is formed with a circular-shaped central opening 22 for receivably mounting a spring assembly, indicated generally at 24.

A lever plate 25 (FIGS. 2, 3 and 9) is pivotally mounted on central bracket portion 17 by a rivet 26 which extends through aligned holes 27 and 28 formed in bracket portion 17 and lever 25, respectively. A bushing 29 is telescopically mounted on rivet 26 and is located within lever hole 28 to provide a bearing for the pivotal movement of lever plate 25. Lever plate 25 is an inexpensive one-piece, stamped sheet metal member preferably having a flat base portion 30 in which pivot mounting hole 28 is formed, a stepped, generally flat, central portion 31, and an outwardly extending, flat end portion 34. A circular boss 32 is formed in central portion 31 and defines a shaft receiving opening 33. End portion 34 has a somewhat irregular-shaped, outwardly extending configuration and is formed with a hole 35.

An idler pulley 38 is rotatably mounted on central portion 31 of lever plate 25 by a stub shaft 39 (FIG. 4) which is press-fitted within circular boss 32 and extends outwardly through shaft receiving opening 33. Pulley 38 is rotatably mounted on the outer end of shaft 39 by a bearing ring 40.

Spring assembly 24 includes a cup-shaped housing 43 formed by a cylindrical wall 44 and an end wall 45. Cylindrical wall 44 terminates in a radially outwardly extending annular flange 46 which defines an open end 47. A coil compression spring 49 having an outer diameter generally complementary to the internal diameter of spring housing 43 is telescopically mounted within housing 43 in abutment with end wall 45.

A plunger clevis 50 has a reduced inner end 51 complementary to the internal diameter of spring 49 and is telescopically mounted within the bore of spring 49. The outer end of clevis 50 is formed with an elongated slot 52. Pivot plate end 34 extends into slot 52 and is pivotally mounted therein by a pivot pin 53.

In accordance with the invention, a damping mechanism, indicated generally at 54, is provided on belt tensioner 1 and is operatively engaged with bracket 10 and lever plate 25. Damping mechanism 54 includes a leaf spring 55 which is mounted at one end on bracket 10 by a rivet 56 (FIGS. 2 and 6) which extends through a hole 57 formed in central portion 17 of bracket 10. Leaf spring 55 includes an extended end 58 which projects through a notch 59 formed in an edge of bracket central portion 17. Spring end 58 selectively engages an indentation or ratchet tooth 61. A series of such indentations or teeth 61 is formed in the inner surface 62 of lever plate 25. Teeth 61 have a generally right angled configuration similar to the teeth formed on usual ratchet bar detent mechanisms. The engagement of spring end 58 with teeth 61 permits lever plate 25 to move in one direction (clockwise, FIGS. 1 and 2) with respect to bracket 10 while retarding relative motion of plate 25 in the opposite or counterclockwise (nontensioning) direction.

Figures 6, 7:
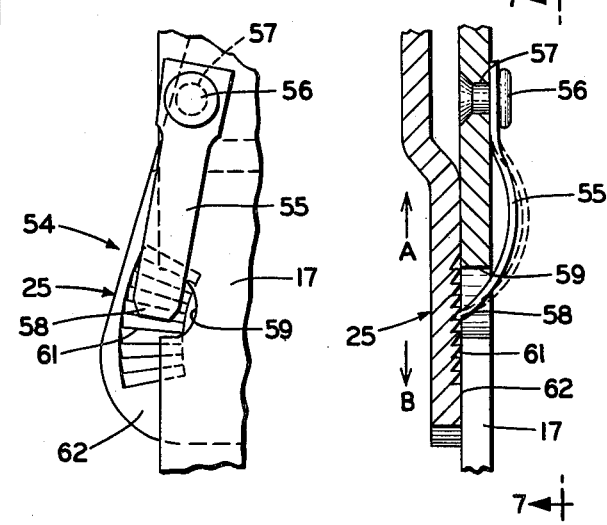
FIG. 6 is an enlarged fragmentary sectional view taken on line 6—6, FIG. 2, showing the improved damping mechanism.
FIG. 7 is a fragmentary view looking in the direction of arrows 7—7, FIG. 6.

The operation of improved belt tensioner construction 1 is shown generally in FIG. 1 and described briefly below. Tensioner 1 preferably is mounted directly on the vehicle engine block or on another engine bracket by bolts 13 at a selected location closely adjacent drive belt 2. Pulley 38 is moved manually in a counterclockwise direction with respect to its mounting location (FIG. 1), compressing coil spring 49 within cup-shaped housing 43. Spring end 58 of leaf spring 55 is manually disengaged from ratchet teeth 61 when manually compressing spring 49 upon movement of lever plate 25 in this counterclockwise direction, which is in the direction of arrow A (FIG. 6). Belt 2 then is placed within pulley groove 41 of pulley 38. After release of the manual restraining force on pulley 38, spring 49 biases pulley 38 in a clockwise belt tensioning direction to apply a predetermined tensioning force on belt 2. Spring strip end 58 will ride easily over the crests of teeth 61 as lever plate 25 moves in this belt tensioning direction (arrow B, FIG. 6) due to the sloped sides of teeth 61.

Leaf spring 55 will bow outwardly, as shown in dash lines, FIG. 6, when a sudden force or shock is applied to pulley 38 by belt 2, which may occur during the sudden acceleration or deceleration of the vehicle. Lever plate 25 will attempt to move in a nontensioning direction (arrow A, FIG. 6) but is prevented from doing so by the engagement of leaf spring end 58 with the right angled sides of ratchet teeth 61. Lever 25 will move only a slight amount in this nontensioning direction during the bowing or flexing of leaf spring 55 and will be returned immediately to its forwardmost position by the action of the main tensioning force of coil spring 49. The continuous biasing force exerted by leaf spring 55 on lever plate 25 prevents an oscillating frequency from developing in coil spring 49. Such undesirable oscillation can occur in those belt tensioner constructions using coil springs for the belt tensioning force due to the tendency of coil springs to develop oscillating frequencies. Leaf spring 55 also provides a positive mechanical means of securing belt tensioning pulley 38 in its forwardmost position, limiting its movement in a nontensioning direction, in addition to providing the unique damping action completely independent of the main tensioning spring force.

Figure 10:
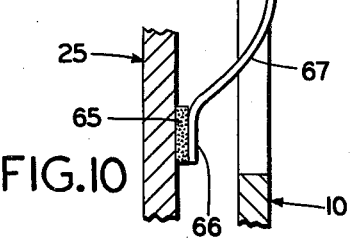
FIG. 10 is a fragmentary sectional view somewhat similar to FIG. 6, showing a modified form of the damping mechanism of the improved belt tensioner.

FIG. 10 shows a somewhat modified form of the improved damping mechanism in which a pad of friction material 65 is mounted on the extended end 66 of a leaf spring 67. Spring 67 is mounted on bracket 10 in a similar manner as is leaf spring 55. This mechanism provides a damping effect by retarding movement of lever plate 25 in a nontensioning direction due to the frictional engagement between the two moving members, but does not provide the positive mechanical retaining means for maintaining lever 25 in its forwardmost position as does the engagement of leaf spring end 58 with ratchet teeth 61, described above. Leaf spring 67, in this modified damping mechanism, also will bow outwardly upon retarding movement of lever plate 25 in the nontensioning direction, again preventing an oscillating frequency developing in coil spring 49.

It is easily understood from the above description and drawings that the improved leaf spring damping mechanism can also be incorporated into a belt tensioning construction of the type wherein one of the vehicle accessories is mounted on a pivotally movable lever for tensioning the drive belt which is operatively engaged with the accessory pulley.

Accordingly, the improved belt tensioner construction provides an effective, safe and efficient device which can be formed relatively inexpensively of stamped sheet metal components, which has a unique damping ability provided by a leaf spring which operates completely independent of the main power source exerted by a compression coil spring, and which mechanically maintains the belt tensioning pulley in its forwardmost position; and which provides a device which eliminates difficulties encountered with prior tensioning devices and arrangements and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved belt tensioner construction is constructed and used, the characteristics of the construction, and the advantageous, new and useful results obtained; the new and useful structures, devices, elements, arrangements, parts, and combinations, are set forth in the appended claims.

I claim:

1. A belt tensioner construction for tensioning an endless drive belt of a drive system for vehicle accessories, said tensioner construction including:
   (a) bracket means adapted to be mounted on a vehicle engine adjacent the drive belt;
   (b) spring means mounted on the bracket means;
   (c) lever means pivotally mounted on the bracket means and biased by the spring means in a belt tensioning direction;
   (d) rotatable pulley means mounted on the lever means and movable into tensioning engagement with the drive belt upon pivotal movement of the lever means by the spring means;
   (e) damping means operatively engageable with the bracket means and lever means to retard oscillatory movement of the lever means, said damping means including a strip of spring steel having one end attached to the bracket means and a second end engageable with the lever means; and
   (f) engagement means provided at the junction of the second end of the strip of spring steel and the lever means to retard pivotal movement of the lever means in a direction opposite to the belt tensioning direction.

2. The tensioner construction defined in claim 1 in which the bracket means has an engine mounting flange at one end and a spring mounting flange at the opposite end; in which the spring means includes a compression coil spring mounted in a cup-shaped housing, with said housing being mounted on the spring mounting flange; and in which a plunger is pivotally mounted on the lever means and is operatively engaged by the coil spring which biases the plunger and lever means in the belt tensioning direction.

3. The tensioner construction defined in claim 1 in which the lever means includes a one-piece lever plate which is pivotally mounted at one end on the bracket means and is engaged by the spring means at the opposite end; and in which the pulley is an idler pulley which is rotatably mounted on the lever plate intermediate the ends of the lever plate.

4. The tensioner construction defined in claim 1 in which the lever means includes a lever plate; in which the engagement means includes a pad of friction material mounted on the second end of the spring steel strip; and in which the pad of friction material engages the lever plate to retard movement of the lever plate to provide a damping effect on the lever plate and belt-engaging pulley means.

5. The tensioner construction defined in claim 1 in which the lever means includes a lever plate; in which the engagement means includes a series of ratchet teeth formed in the lever plate, with the second end of the spring steel strip being selectively engaged with one of said teeth; and in which the spring steel strip flexes upon movement of the lever plate in a direction opposite to the belt tensioning direction to retard such movement of the lever plate and to provide a damping effect on the lever plate and belt-engaging pulley means.

6. The tensioner construction defined in claim 5 in which the bracket means and lever means are each one-piece sheet metal members; in which pin means pivotally mount the lever means on the bracket means; and in which the pulley means is an idler pulley rotatably mounted on the lever means.

7. A belt tensioner construction for tensioning an endless drive belt of a drive system for vehicle accessories, said tensioner including:
   (a) a bracket adapted to be mounted on a vehicle engine adjacent the drive belt;
   (b) a spring mounted on the bracket;
   (c) a lever plate pivotally mounted on the bracket and biased by the spring in a belt tensioning direction;
   (d) an idler pulley rotatably mounted on the lever plate and movable in the belt tensioning direction upon pivotal movement of the lever plate by the spring for tensioning engagement with the belt;
   (e) a series of ratchet teeth formed in the lever plate; and
   (f) a strip of spring steel mounted on the bracket, said strip having an extended end selectively engageable with one of the ratchet teeth to retard movement of the lever plate and idler pulley in a direction opposite to the belt tensioning direction and to provide a damping effect on the lever plate.

8. The belt tensioner construction defined in claim 7 in which the bracket and lever plate are each one-piece metal members.

9. The belt tensioner construction defined in claim 7 in which the bracket is formed with a notch adjacent an edge of the bracket; in which the spring steel strip is attached by a rivet on the bracket; and in which the extended end of the strip extends through the bracket notch for engagement with the ratchet teeth which are aligned with said notch.

10. The belt tensioner construction defined in claim 7 in which a cup-shaped housing is mounted on the bracket; in which the spring is a compression coil spring mounted in the cup-shaped housing; and in which a plunger is pivotally mounted at one end on the lever plate and is operatively engaged by the spring to bias the lever plate in the belt tensioning direction.

11. The belt tensioner construction defined in claim 10 in which the bracket is formed with a circular-shaped hole; in which the cup-shaped spring housing terminates at one end in a radially outwardly extending annular flange; and in which the spring housing is removably mounted in the bracket hole with the housing flange engaging the bracket to mount the housing in the bracket hole.

12. An improved damping construction for a belt tensioner of the type having a rotatable pulley which engages an endless drive belt of a drive system for vehicle accessories, in which the belt engaging pulley is mounted on a lever which is pivotally mounted on a bracket, and in which the lever and pulley are moved in a belt tensioning direction by a spring which is operatively engaged with the bracket and lever, wherein the improvement includes:

(a) a series of ratchet teeth formed in the lever; and
(b) a strip of spring steel mounted on the bracket, said strip having an extended end selectively engaged with one of the teeth to retard movement of the lever and pulley in a direction opposite to the belt tensioning direction and to provide a damping effect on the lever by flexing upon a force being exerted on the pulley in a direction opposite to the tensioning force exerted by the spring.

* * * * *